United States Patent [19]

Wright et al.

[11] Patent Number: 4,750,353

[45] Date of Patent: Jun. 14, 1988

[54] METHOD OF VOLTAGE COMPENSATION FOR AN AIR/FUEL RATIO SENSOR

[75] Inventors: Danny O. Wright, Grafton; Michael J. Frick, Newport News, both of Va.

[73] Assignee: Allied Corporation, Morris Township, Morris County, N.J.

[21] Appl. No.: 18,659

[22] Filed: Feb. 25, 1987

[51] Int. Cl.[4] .............................................. G01M 19/00

[52] U.S. Cl. .................................................... 73/118.1

[58] Field of Search .................... 73/119 R, 118.1, 23; 123/440, 489; 364/431.06

[56] References Cited

U.S. PATENT DOCUMENTS 4,130,095 12/1978 Bowler et al. ...................... 123/440
4,255,789 3/1981 Hartford et al. .................... 123/417
4,344,317 8/1982 Hattori et al. .......................... 73/23
4,459,669 7/1984 Chujo et al. .................. 364/431.06

*Primary Examiner*—Stewart J. Levy

*Assistant Examiner*—Robert R. Raevis

*Attorney, Agent, or Firm*—Russel C. Wells; Markell Seitzman

[57] ABSTRACT

A method of voltage compensation for an air/fuel ratio sensor as may be used in the exhaust system of a fuel injected internal combustion engine. The method comprises the steps of storing the design supply voltage in a look-up table, measuring the real time supply voltage and calculating a binary fraction value from the ratio of the present or real time supply voltage value and the design supply voltage value. The predetermined design threshold voltage value of the sensor is stored and then it is multiplied by the binary fraction value to get a real time threshold voltage value. The voltage output of the sensor is measured and compared with the real time threshold voltage value. In response to the comparison, a control signal is generated indicating whether or not the air/fuel mixture is lean.

2 Claims, 1 Drawing Sheet

METHOD OF VOLTAGE COMPENSATION FOR AN AIR/FUEL RATIO SENSOR

This invention is directed to provide a method for voltage compensation of sensor voltages in sensing systems in general and more particularly for the output voltage of a titania exhaust gas sensor as used in motor vehicle exhaust systems.

BACKGROUND OF INVENTION

Prior Art

Exhaust gas sensors for use in the exhaust gas system of motor vehicles to measure the products of combustion are generally supplied with regulated voltage levels. In this manner, the output voltage signal generated by the sensor, which is very small when compared to the supply voltage, can be compared directly in a comparator. The comparator typically has one input from the sensors and a second input from a voltage divider wherein the regulated supply voltage is divided down to a switchpoint or threshold voltage level.

When the exhaust gas sensor is a zirconia sensor, the switchpoint or threshold voltage level is approximately 430 millivolts. The range of the sensor output voltage signal is from a few millivolts to one volt. The zirconia sensor functions as a battery in that the oxidation process of the exhaust gas initiates a chemical reaction and the output signal is a voltage level with a small amount of power.

When the exhaust gas sensor is a titania sensor, the switchpoint or threshold voltage is approximately the same level. The titania sensor, contrary to the zirconia sensor is a variable resistance device. In the typical system configuration, the titania resistor and an ordinary fixed resistor form a voltage divider to a supply voltage. Often, this supply voltage is also used to power and internal heating element on the sensor. At the electrical junction of the fixed resistor and the sensor resistor, the reaction of the titania to the exhaust gas will provide an output voltage signal indicating the composition of the exhaust gas; more particularly the amount of oxygen present in the exhaust. In the typical system, the supply voltage must be regulated, or else errors in determination of air/fuel ratios will result.

SUMMARY OF INVENTION

It is a principal advantage of the present system to implement a method in software to achieve voltage independence from the system supply voltage during the sensor operation.

It is another advantage to make the signal processing of the switch-over or threshold voltage level to be ratiometric with respect to the system supply voltage.

It is another advantage of the invention to avoid having special voltage regulation circuits providing a regulated voltage in the sensor circuits.

These and other advantages will become apparent from the method of voltage compensation for an air/fuel ratio sensor employing the steps of determining and storing in a look-up table the design supply voltage value for the sensor calculations. Measuring the present supply voltage value and storing it in the look-up table. Calculating a binary fraction value from the ratio of the present supply voltage value and the design supply voltage value. Storing the predetermined design threshold voltage value of the sensor in the look-up table. Then multiplying the predetermined design threshold voltage value by the binary fraction value to provide a real time threshold voltage value. The voltage ouput of the air/fuel ratio sensor is sampled or measured and the sampled voltage output of the sensor is compared with the real time threshold voltage value and a control signal is generated for indicating whether or not the air/fuel mixture is lean.

Many other objects and purposes of the invention will be clear from the following detailed description of the drawings.

DETAILED DESCRIPTION

Figure 1:
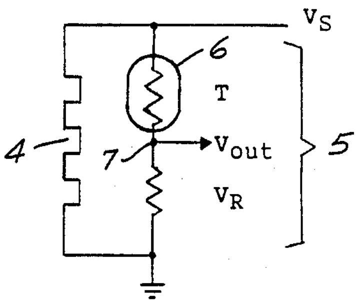
FIG. 1 is a schematic of the sensor system.

FIG. 1 is a schematic of a titania exhaust gas sensor in the preferred embodiment. The supply voltage $V_S$ supplies power to a heater 4 and to a voltage divider or sensor circuit 5 comprising the sensor 6 and a series resistor $V_R$. At the junction 7 of the sensor 6 and the series resistor $V_R$, the sensor output voltage $V_{out}$ is found. In prior art systems, the voltage to the sensor circuit 5 is generally a regulated voltage and the voltage to the heater 4 is typically a controlled but unregulated voltage. This is an expensive system in that a regulated voltage supply is more expensive in terms of cost and components than a non-regulated supply.

Figure 2:
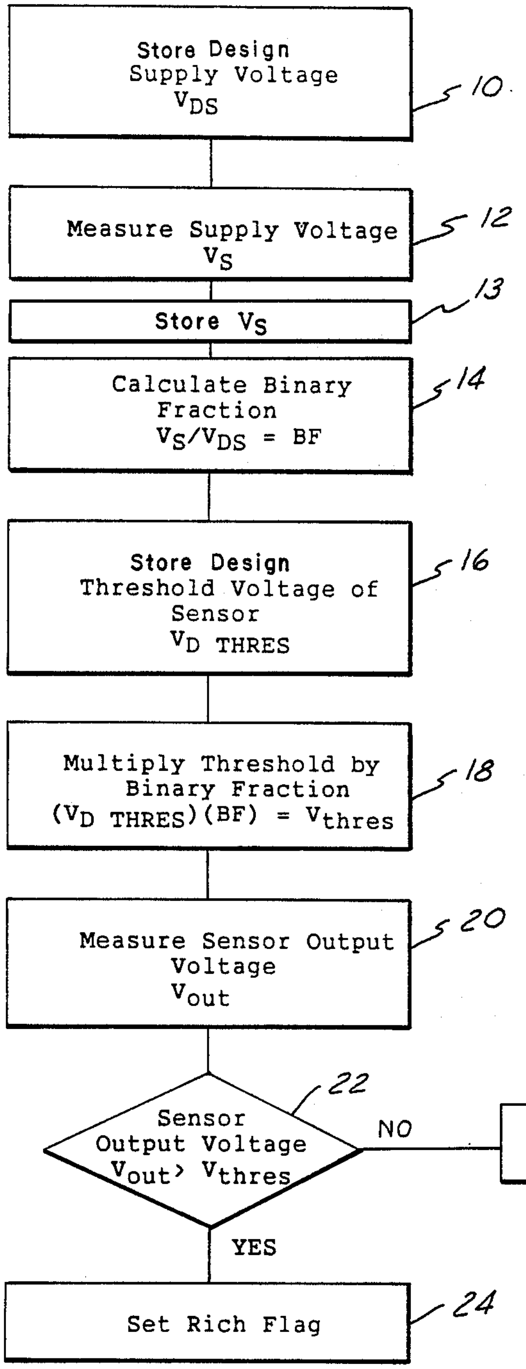
FIG. 2 is a flow chart of the system.

The purpose of the method of voltage compensation for an air/fuel ratio sensor according to FIG. 2 is to provide an accurate, real time determination from the exhaust gases of an internal combustion engine if the air/fuel mixture is completely burned. If it is, then the air/fuel ratio is at the stoichiometric point of the mixture. If the air/fuel mixture is other than equal to the stoichiometric ratio, the system must adjust either the air coming into the system or the fuel being supplied to the system.

In the present internal combustion engines having fuel injection systems which are designed with closed loop control, the exhaust gas sensor is the control element indicating the characteristic of the fuel mixture being supplied to the engine. If the sensor indicates that there is still unburned oxygen in the exhaust, the control system will call for the addition of more fuel and conversely if there is still unburned fuel in the exhaust, the control system will call for the addition of more air. Most systems are designed to dither about the stoichiometric point of the fuel mixture.

With the use of microprocessor based engine control systems, many of the functions previously carried out by various hardware components are accomplished in software. Values are stored in look-up tables which may be memory locations that are addressed by a parameter matrix; values are combined in various registers; values are also compared by means of registers.

Referring to FIG. 2, the steps of the method of voltage compensation for an air/fuel ratio sensor are detailed. The first step 10 is to determine the design supply voltage $V_{DS}$ for the sensor system. This value $V_{DS}$ is stored in a look-up table by the system designer. When this value $V_{DS}$ is needed, the microprocessor addresses the look-up table in a the conventional manner and the value is read and stored in an operating unit such as a register.

In the next step 12 the actual supply voltage $V_S$ of the system on a real time basis is measured. This value $V_S$ is also stored 13 in a look-up table or in an operating unit such as a register. This value $V_S$ is a changing value and may vary several volts during the operation of the vehicle, hence it is measured on a real time basis during the operation of the vehicle.

The two values, the design supply voltage $V_{DS}$ and the actual supply voltage $V_S$ are then combined in the third step 14 to generate a binary fraction BF which is generally in the form of a binary word value. This is accomplished by dividing the actual supply voltage $V_S$ by the design supply voltage $V_{DS}$ and the quotient BF is usually a value less than one.

In the next step 16 the predetermined design sensor switchpoint or threshold voltage value $V_{D\ THRES}$ is stored in the look-up table and this value then becomes one input to a comparator means 22. This design sensor threshold voltage $V_{D\ THRES}$ value is then multiplied 18 by the value BF to get a real time threshold value $V_{thres}$ for sensor that is ratiometric with the actual supply voltage $V_S$. If the supply voltage $V_S$ is less than the design supply voltage $V_{DS}$, the threshold value of the sensor is reduced in a ratiometric manner. Conversely if the measured value of the supply voltage $V_S$ is greater than the design supply voltage $V_{DS}$, the threshold value of the sensor is increased in a ratiometric manner.

The actual or real time value of the sensor output voltage $V_{out}$ is measured 20 and stored in a register. This value indicates the quality of combustion of the air/fuel mixture in the engine. The adjusted value of the sensor threshold voltage $V_{thres}$ is one input to a comparator means 22 and the sensor output voltage $V_{out}$ is another input. If the sensor output voltage $V_{out}$ is greater 24, the air/fuel mixture in the exhaust has an excess of fuel and the system will reduce the fuel. Conversely if the sensor output voltage $V_{out}$ is less 26, the system will increase the fuel or reduce the air.

In the microprocessor, the characteristic of the air/fuel ratio is indicated by the setting or resetting of a bit or flag in a predetermined location within the microprocessor. In one such system, the setting of a flag indicates a 37 rich" fuel mixture and the absence of a flag indicates a 37 lean" fuel mixture. Such a flag may be a certain bit position in the look-up table and the setting or resetting is accomplished by means of a binary one or binary zero bit value.

There has thus been shown and described a method of voltage compensation for an air/fuel ratio sensor as may be used in the exhaust gas system in an internal combustion engine to measure the air/fuel mixture supplied to the engine. Many of the steps, as herein defined, may be interchanged or the order changed prior to the step of comparing without departing from the scope of the invention.

We claim:

1. A method of voltage compensation for an air/fuel ratio sensor connected to a nonregulated voltage supply, the sensor used in an internal combustion engine for sensing the air/fuel mixture supplied to the engine, the method comprising the steps of:

storing in a look-up table a design supply voltage value used in calculations of the air/fuel ratio values;

measuring the value of the actual unregulated supply voltage and storing said actual unregulated supply voltage value in a look-up table;

calculating a binary fraction value from the ratio of said actual unregulated supply voltage value and said design supply voltage value;

storing a design threshold voltage value of the sensor in a look-up table;

multiplying said design threshold voltage value with the binary fraction value to get a real time threshold voltage value;

sampling the voltage output of the air/fuel ratio sensor;

comparing said voltage output with the real time threshold voltage value; and then;

generating a control signal if said voltage output is less than said real time threshold voltage value indicating a lean air/fuel mixture.

2. A method of voltage compensation for an air/fuel ratio sensor according to claim 1 wherein the air/fuel ratio sensor is a titania sensor.

* * * * *